Aug. 19, 1969    D. BINI    3,462,521
METHOD FOR ERECTING STRUCTURES
Filed Dec. 12, 1966    6 Sheets-Sheet 1

INVENTOR
DANTE BINI
BY
[signature]
ATTORNEYS.

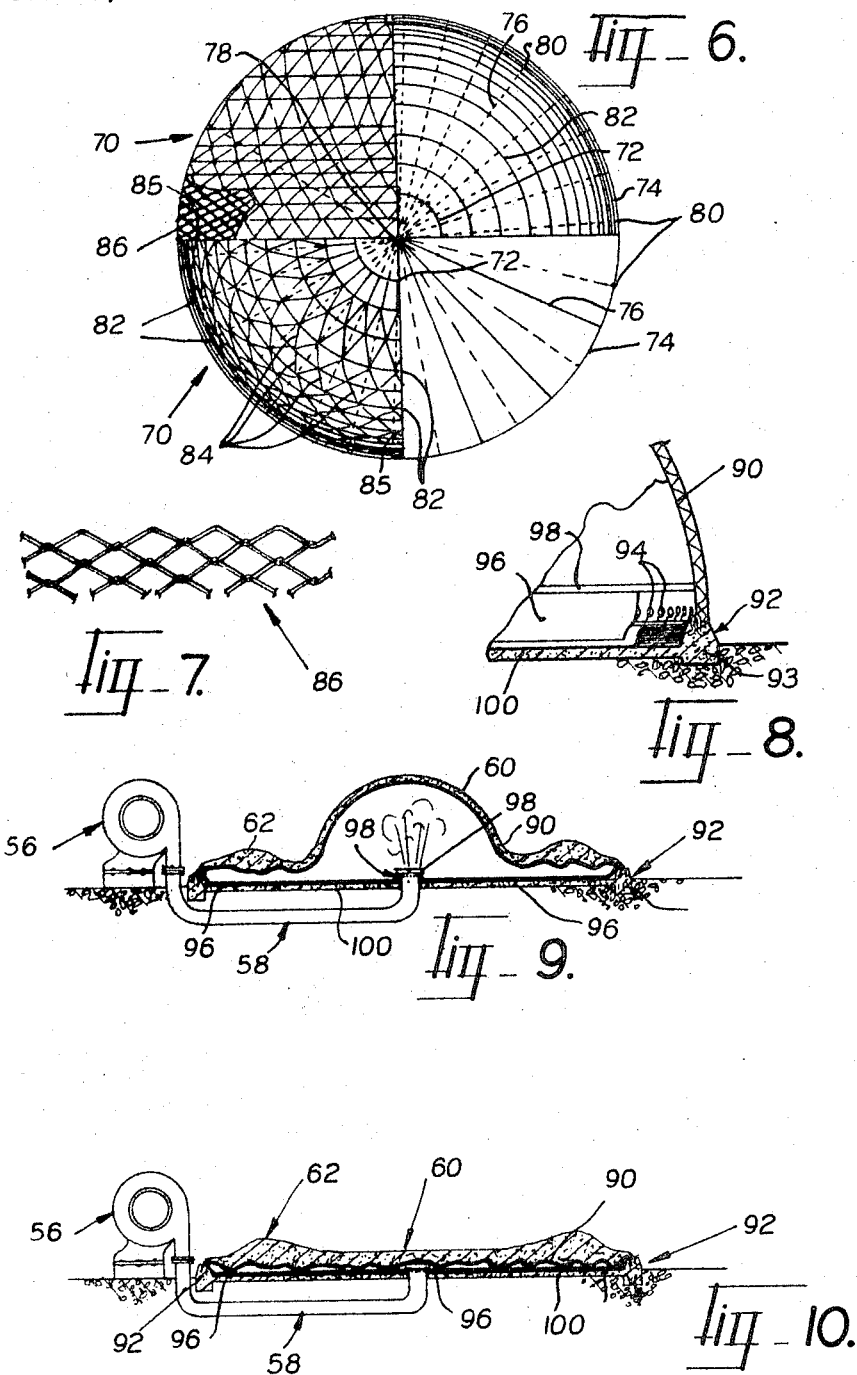

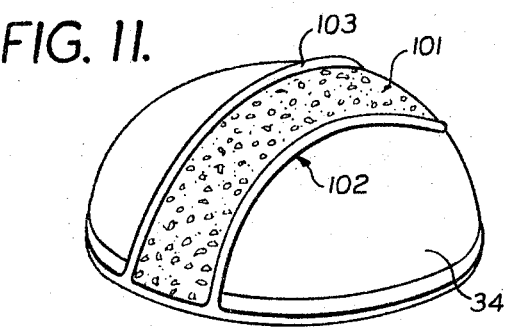
FIG. 11.
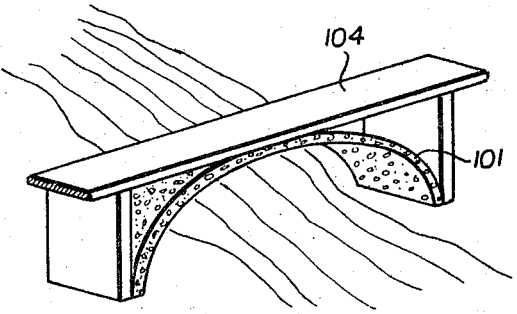
FIG. 12.
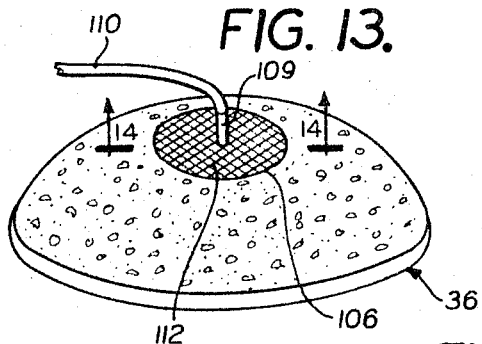
FIG. 13.
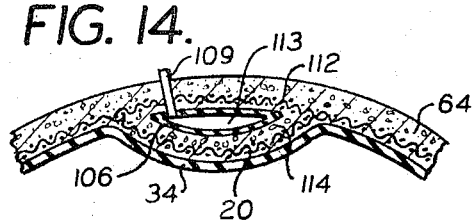
FIG. 14.
FIG. 16.
FIG. 14a.
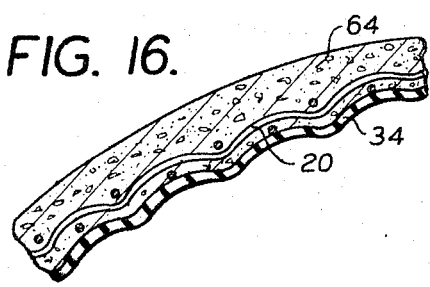
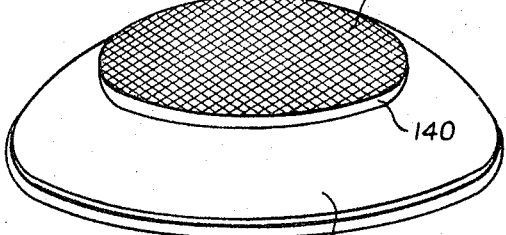
FIG. 18.
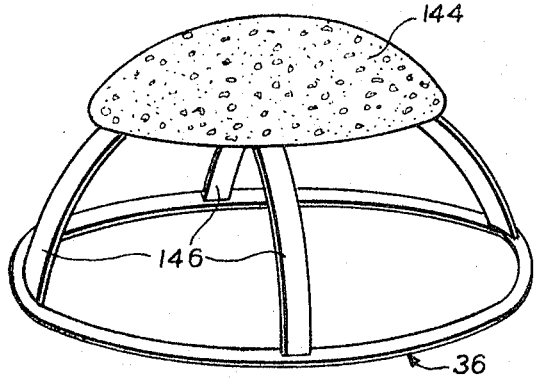
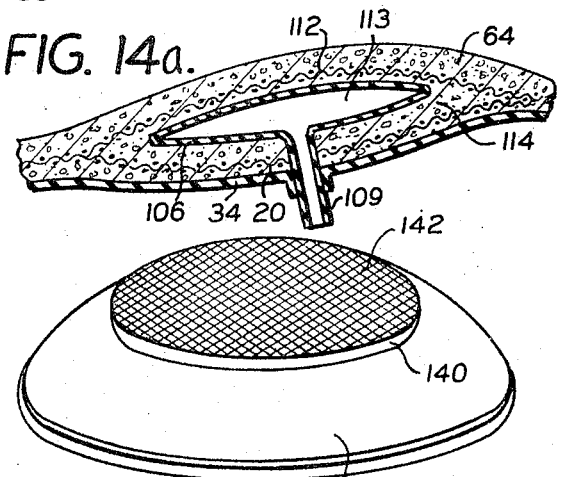
FIG. 17.
INVENTOR
DANTE BINI
BY
ATTORNEYS.

INVENTOR
DANTE BINI
BY
*Hubbell Cohen ...*
ATTORNEYS.

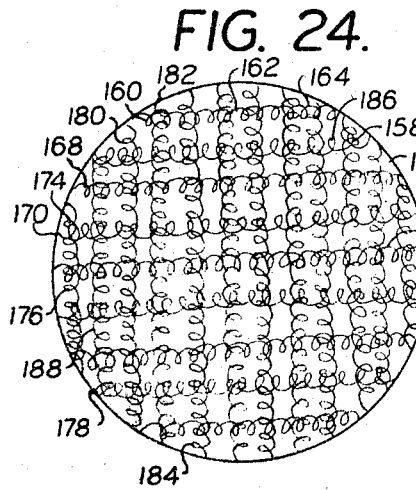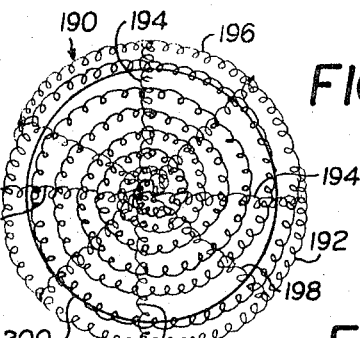

INVENTOR
DANTE BINI
BY
ATTORNEYS.

United States Patent Office
3,462,521
Patented Aug. 19, 1969

3,462,521
METHOD FOR ERECTING STRUCTURES
Dante Bini, Bologna, Italy, assignor to Binishells S.p.A., Milan, Italy, a corporation of Italy
Continuation-in-part of application Ser. No. 498,272, Oct. 20, 1965. This application Dec. 12, 1966, Ser. No. 601,176
Int. Cl. E04b 1/32; B32b 13/06; B28b 23/02
U.S. Cl. 264—32
32 Claims

ABSTRACT OF THE DISCLOSURE

Method for erecting domelike and other structures. Employs a sheetlike expandable member which is inflatable to substantially the desired shape of the structure. Includes the steps of positioning expandable reinforcing means, preferably of metal, over the member, distributing a hardenable building material such as concrete over the member and reinforcing means to form a layer, and then inflating the member whereby to raise the member, the expandable reinforcing means and the hardenable building material to the desired shape.

This invention relates to new and improved methods for the construction of structures.

This application is a continuation-in-part of my co-pending application for U.S. Patent, Ser. No. 498,272, filed Oct. 20, 1965, and now abandoned.

Since the end of World War II, the costs of construction of structures, and especially habitable structures in the nature of homes, offices, schools and the like, constructed in accordance with conventional methods and apparatus of construction, have skyrocketed—due in no small measure to tremendous increases in labor costs—whereby the provision of adequate housing, schools and the like, represents, beyond question, one of the most pressing problems facing the nations of the world today. This problem is believed made further acute by the fact that, in addition to requiring large financial outlays which, in many instances in many nations, are simply not available, construction of such structures by conventional methods and apparatus also requires a multitude of variously skilled personnel which, again in many instances in many nations, are similarly or even more unavailable.

It is, accordingly, a primary object of this invention to provide new and improved methods and apparatus for the construction of structures at costs which are significantly lower than those which result from the construction of comparable structures through the use of any of the methods and apparatus of construction known in the world today.

Another object of this invention is the provision of new and improved construction methods which require the performance of only a minimum of simple, readily learned steps by a minimum of personnel, whereby the required skills may be readily acquired by relatively unskilled personnel and the utilization of the said methods made independent of the availability of large numbers of skilled personnel.

Another object of this invention is the provision of new and improved methods of construction which enable the construction of structures in absolutely minimum time periods as compared to the time periods required for comparable constructions through the use of conventional construction techniques.

Another object of this invention is the provision of new and improved methods and apparatus which require minimum site clearance and foundation construction operations.

Another object of this invention is the provision of new and improved methods of construction which require the use of only readily available and generally uncomplicated construction materials and apparatus of proven dependability, whereby the utilization thereof is made independent of large supplies of relatively sophisticated construction materials and apparatus.

Another object of the invention is the provision of new and improved methods of construction which are particularly, though by no means exclusively, adapted to the construction of dome-shaped structures of maximum strength per unit of cross sectional structure area.

Another object of this invention is the provision of new and improved methods of construction which are particularly, though by no means exclusively, adapted to the construction of prestressed structures with resultant increased strength characteristics.

A further object of this invention is the provision of new and improved methods of construction which are particularly, though by no means exclusively, adapted to the construction of metal reinforced, concrete structures.

In a herein disclosed preferred embodiment, the new and improved methods of construction of this invention encompass the use of a fluid-tight member which is inflatable to assume substantially the shape of a structural shell to be erected, or at least a portion thereof. Anchor means of generally uncomplicated construction are utilized to seal the edges of the said member at ground level and thus provide a fluid-tight volume therewithin, and the said anchor means may also function as the foundation of the completed structure. In use, the said inflatable member is secured to the said anchor means to provide the said fluid-tight volume, reinforcing means which are expandable with the said inflated member to substantially the shape of the structural shell are preferably, though not necessarily, placed thereover and secured to the said anchor means, an air-hardenable building material in the nature of concrete is poured over the said inflatable member and reinforcing means, and the inflatable member is inflated to raise the said building material and reinforcing means to the desired structural shape, whereupon the hardening of the said building material results in a completed structural shell.

The above and other objects and advantages of this invention are believed made clear by the following detailed description thereof taken in conjunction with the accompanying drawings wherein:

FIG. 6 is a top plan view with parts in elevation of another form of reinforcing means;

FIG. 7 is a fragmentary elevational view of a portion of the reinforcing means of FIG. 6;

FIG. 8 is a vertical cross-sectional view of other forms of anchor and inflatable member means, respectively;

FIGS. 9 and 10 are vertical cross-sectional views illustrating the construction of a dome-shaped structure through the use of the reinforcing, anchoring and inflatable member means, respectively, of FIG. 8;

FIG. 11 is a perspective view illustrating the construction of an arch in accordance with the present method;

FIG. 12 is a perspective view of a viaduct bridge utilizing an arch constructed in accordance with FIG. 11;

FIG. 13 is a perspective view illustrating the construction of a modified form of dome-shaped structure;

FIG. 14 is a vertical cross-sectional view taken along line 14—14 in FIG. 13;

FIG. 14a is a view similar to FIG. 14 and showing a modification thereof;

FIG. 16 is a vertical cross-sectional view illustrating a different form of interior wall configuration made possible through the use of somewhat different inflatable member means;

FIGS. 17 and 18 illustrate the construction of a structure roof portion, only, through the use of the methods and apparatus of this invention;

FIGS. 19, 20 and 21 are diagrammatic vertical sectional views illustrating a modified method of erecting a structure in accordance with the invention;

FIGS. 22 and 23 are views similar to FIG. 20 showing still another modified form of erecting structures in accordance with the present invention;

FIG. 24 is a diagrammatic plan view of a stretchable reinforcement for structures embodying the present invention;

FIG. 25 is a view similar to FIG. 24 showing still another form of stretchable reinforcement;

FIG. 26 is a fragmentary view of a stretchable reinforcement in accordance with FIGS. 24 and 25 which includes means for limiting the amount of stretch of a portion at least of said reinforcement;

FIG. 27 is a perspective view of a dome-shaped structure which was constructed utilizing a stretchable balloon, a stretchable reinforcement, and means for limiting the stretching of a portion of said reinforcement.

Figure 2:
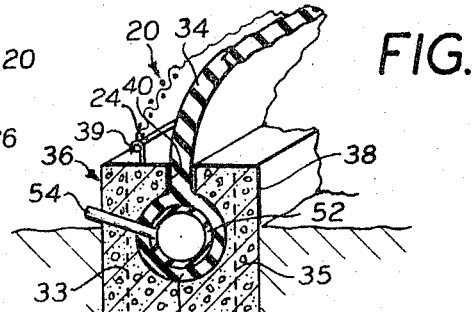
FIGS. 2 and 3 are perspective views, with parts in vertical cross-section, of similar portions of two preferred forms of anchor means, and the presently preferred form of inflatable member means, respectively.
Figure 4:
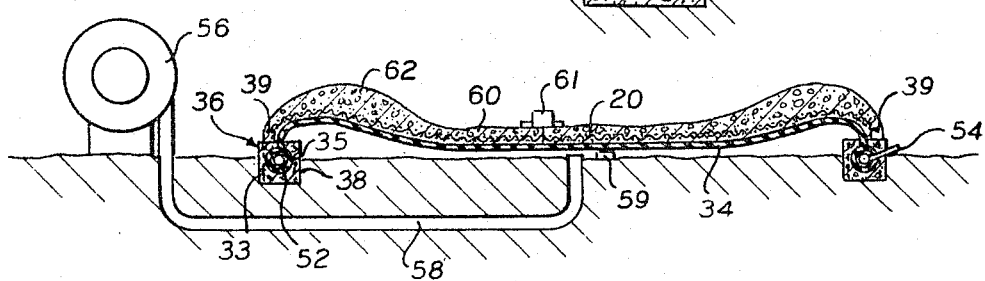
FIGS. 4 and 5 are vertical sectional views illustrating the erection of a dome-shaped structure through the use reinforcing, anchor and inflatable member means of FIGS. 1 and 2.
Figure 5:
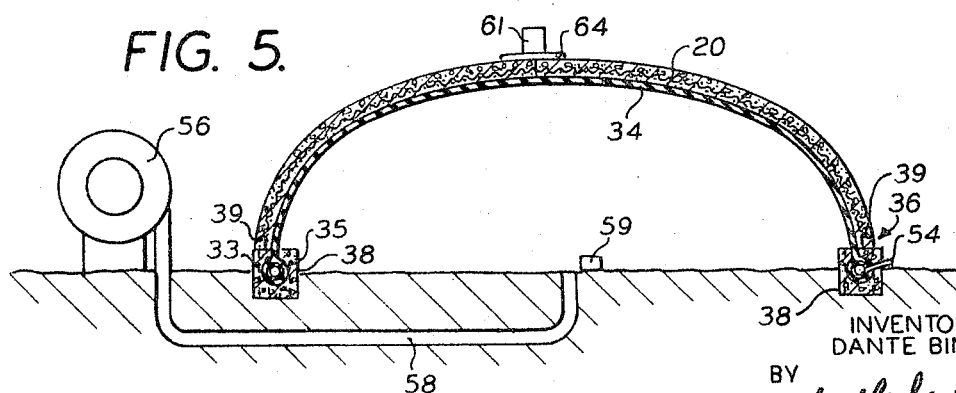

Referring initially in general to FIGS. 2, 4 and 5, the erection of a dome-shaped shell 64 through the use of the currently preferred method and apparatus of this invention may be seen to comprise the formation of anchor block 38 which includes a keyhole-type slot 40 formed therein. An air-tight balloon member 34, including anchoring ring 50 formed at the edge thereof an inflatable into substantially the shape of the keyhole-type slot 40, is provided, and is secured, in substantially airtight manner, to the anchor block 38 by the placement of the said anchoring ring in the said keyhole-type slot and subsequent inflation of the former. The balloon member 34 is inflatable to substantially the desired shape of the shell 64, and pump 56, including a discharge conduit 58 extending therefrom as shown, is provided to inflate the balloon member 34. Reinforcing means 20 which are expandable to substantially the desired shape of the shell 64 along with the balloon member 34 upon the inflation of the latter, are positioned as shown to rest on the upper surface of the anchor block 38 and substantially cover the surface of the balloon member 34 as seen in FIG. 4. The said reinforcing means are preferably attached to the said anchor block through the use of hook 39 which extends upwardly from the said upper anchor block surface. A hardenable building material in the nature of concrete as indicated at 60 is then poured over the balloon member 34 and reinforcing means 20 to completely cover the same and is distributed thereover as indicated at 62 in FIG. 4. Inflation of the balloon member 34 is then effected, through operation of pump 56, whereupon the reinforcing means 20 and the building material 60 are raised to the positions thereof depicted in FIG. 5 to form the dome-shaped shell 64. The maintenance of the balloon member 34 in the inflated condition thereof for a period of time sufficient to enable the hardening of the building material 62 then completes the erection of the shell 64.

Figure 1:
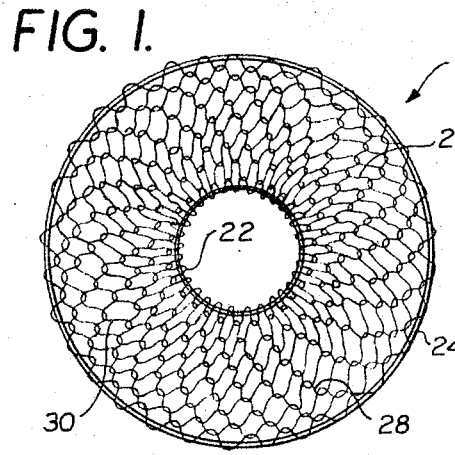
FIG. 1 is a top plan view of the presently preferred form of reinforcing means for use with the methods of the invention.

Referring now in detail to FIG. 1, the presently preferred form of reinforcing means for use in the practice of the method of this invention is indicated at 20 and comprises an inner ring 22 and an outer ring 24 connected by chain link mesh 26 of the depicted, intermeshed two counter-directed pinwheel type configuration as indicated at 28 and 30.

Preferably, the reinforcing means 20 are constructed of metal, as for example, steel, which will provide excellent reinforcement for building materials in the nature of concrete in the manner believed well known in the art. Alternatively, the said reinforcing means may be constructed from any material which exhibits good strength characteristics in tension and will not be chemically attacked by the building material.

Thus, for example, if the building material is concrete, the reinforcing means 20 should not be constructed of fiberglass because the latter may be chemically attackable by the concrete. In this instance, other materials which exhibit good strength characteristics in tension and are not attackable by the concrete as, for example, asbestos or rock wool fibers, or synthetic fibers in the nature of acrylic or polyester fibers could be employed. Alternatively, if the building material is not concrete, but, for example, a plastic material, then the material from which the reinforcing means 20 is constructed must, of course, be compatible with the plastic rather than with concrete.

While the depicted, intermeshed two counter-directed pin-wheel type configuration of the mesh 26 proves to be the most desirable configuration thereof when an analysis of the stresses to which the completed structure will be subjected is made, this configuration is not, from a practical viewpoint, an absolute necessity. Thus, for example, a latitude and meridian configuration of the nature described in detail hereinbelow with reference to FIG. 6, may be utilized in the construction of the reinforcing means 20 to provide satisfactory reinforcement for the building. Alternatively, if fibers of the nature referred to hereinabove are used in the construction of the said reinforcing means, satisfactory employment might be made of a completely random orientation thereof, or various types of criss-cross arrangements thereof.

Further, although chain link mesh of the nature depicted in FIG. 1 has proved eminently suitable in the construction of the reinforcing means 20, other types of mesh configurations may be satisfactorily employed therefor as, for example, interlock coils or serpentine springs of the nature commonly found in the constructions of inexpensive bed springs.

It may thus be said that, in general, the key to the construction of the mesh 26 is that it must be readily deformable from a 2-dimensional configuration to a 3-dimensional configuration for purposes made apparent hereinbelow. Generally speaking, the mesh configurations which exhibit this necessary property are either of the chain link type wherein there is substantial looseness or give provided by the said chain links when the mesh is collapsed, or of the spring type whereby the mesh exhibit elastic properties and can thus be readily stretched from a 2-dimensional configuration to a 3-dimensional configuration.

Alternatively, the mesh 26 may be constructed of a fabric which is a fibrous counterpart of the chain link mesh, in that the said fabric is flaccid. Another possibility in this regard would consist of relatively short lengths of steel reinforcement means which are embedded in random manner in the building material, it being noted that the use of reinforcing means of this nature would not appear as desirable as those described hereinabove but would, in any event, provide reinforcing properties which might prove satisfactory for some building applications.

Although the use of reinforcing means in the nature of 20 will probably prove desirable in most applications of the method of this invention, it is to be clearly understood that, in some instances, buildings and other structures can be constructed in accordance with the said method without requiring the use of any reinforcement means whatsoever. This would be possible, for example, in the case of the construction of a very shallow dome-shaped structure wherein practically every part thereof is in compression and hence would not require reinforcement in tension.

Referring now to FIGS. 2 through 5, inclusive, an inflatable or balloon member is indicated at 34 and is constructed so that, upon the inflation thereof, it or at least some portion thereof, will assume substantially the shape of the structure to be erected.

Generally speaking, the balloon member 34 can be made of any type of air impervious flaccid material of suitable strength characteristics, with nylon reinforced neoprene being a material which has proven particularly satisfactory for this use. Alternatively, similarly air impervious materials in the nature of polyethylene, polypropylene and vinyl, reinforced or unreinforced, would also prove satisfactory in the construction thereof. As will be discussed in greater detail subsequently, highly stretchable materials, such as rubber, ethylene-propylene copolymer, ethylene-propylene terpolymer and various synthetic rubbers provide special advantages as balloon materials. The balloon member 34 must, of course, be strong enough so that it will not break during the inflation thereof.

While it is true that the reinforcement means 20 will take up most of the building material bulk loading, at each individual mesh opening in cases where the reinforcement means 20 are included, the balloon member 34 must be strong enough to support itself and substantially all of the weight of the said reinforcing means and building material over said opening, at least until the concrete commences to set. Generally speaking, it can be said that the requisite strength of the balloon member is directly related to the size of the building to be erected, in that an increase in the said size will require an increase in the said requisite strength.

Strengthening of the balloon member 34 can also be effected during the construction thereof by the inclusion of fibrous reinforcements in the material from which the said balloon member is made.

Means to anchor the edges of the balloon member 34 in a substantially air-tight manner during the inflation thereof, and attendant erection of the structure, are indicated generally at 36 and, as best seen in FIG. 2, preferably take the form of an anchor block 38, which, as shown, is partially embedded in the ground and, in most instances wherein the structure to be erected is a building, defines the border thereof at ground level. In addition, the said anchor block will function as the foundation of the completed structure as made clear hereinbelow.

The said anchor block may be made of any readily available material which exhibits suitable strength characteristics, as for example, concrete, whereby it may be preformed from precast concrete and delivered as such to the construction site, or alternatively, may be cast in place at the construction site through the use of conventional wooden frame molds.

A keyhole-type slot 40 is formed as shown in the anchor block 38, preferably with the slot opening in the upper surface of the latter, and the slot 40 is preferably coextensive with the anchor block 38 to provide means for removably attaching the balloon member 34 to the said anchor block in the manner described in detail hereinbelow.

If the anchor block 38 is constructed of concrete, the said keyhole-type slot may be readily formed therein through the use of nonillustrated annular inflatable means in the nature of a tire tube having a shape, when inflated, which corresponds to the shape of said cylindrical portion of the slot. Thus, for example, if the anchor block 38 is to be constructed from cast in place concrete at the construction site, the conventional wooden or metal frame molds therefor may be appropriately positioned in the ground, the said nonillustrated inflatable member properly positioned within the said molds and inflated, or vice versa, the concrete poured into the said mold to form the said anchor block, and after the concrete has hardened the said nonillustrated inflatable means deflated and removed therefrom for reuse. Preferably, though not necessarily, metal reinforcement members 33 and 35 extend as shown through the anchor block for obvious purpose, and the reinforcement members 33 extend beyond the upper surface of the block to form circumferentially spaced hooks 39 for the attachment of the reinforcing means 20 to the anchor block 38.

Figure 3:
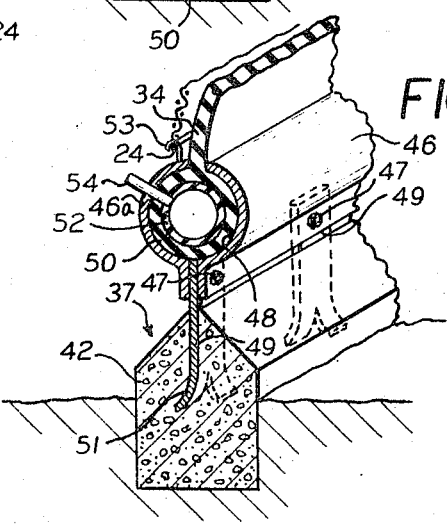

If steel is used in part of the construction of the anchoring means, the same will preferably take the form illustrated at 37 in FIG. 3 which comprises a concrete substructure 42 which may be partially or fully embedded in the ground. A keyhole type slot 48 of the same nature as that indicated at 40 in FIG. 2, is formed by generally arcuate metal members 46 and 46a which are attached as shown by nut and bolt means 47 extending therethrough. The arcuate metal members 46 and 46a are supported from the concrete substructure 42 by spaced, leg-like members 49 which are attached between the arcuate metal members 46 and 46a by the nut and bolt means 47 and extend therefrom as shown into the concrete substructure 42. Proper embedment of the members 49 in the concrete substructure 42 is insured by bending adjacent portions of the extremities of the former in opposite directions in the manner indicated at 51 in FIG. 3. Of course, steel may be used in place of concrete substructure 42 and be formed integrally with leg-like members 49. Hooks 53 in the nature of hooks 39 may be secured to the arcuate member 46a in any convenient manner, for example by spot welding, at circumferentially spaced points on the latter.

For use with either type of the anchor means 36 or 37, the balloon member 34 will include an inflatable anchoring ring 50 attached to, or formed integrally with, the edge thereof, with the exterior shape of the said ring, when inflated, conforming closely to the shapes of the respective keyhole slots 40 and 48. Preferably, although not necessary to the practice of the method of this invention, an inner inflatable ring 52 will be positioned as shown within the anchoring ring 50 in the manner analogous to the positioning of a tube within a tire, whereby inflation of the inner ring 52 will also result in inflation of the anchoring ring 50, and abrasion during inflation will be taken up by the anchoring ring 50 to provide a safety factor against leakage from the inner ring 52 and enable many subsequent reuses of the balloon member 34, as should be obvious.

Preferably, the inner ring 52 will be sectionalized, and inflated in sections, whereby the inflation of the said ring will be made easier because the volume of air needed to inflate any one section will be relatively small; and the discovery and repair of any leaks which do develop in the inner ring 52 will be made much easier in that the same would, in all probability, be restricted to one section. The inflation of the inner ring 52 or inner ring sections, as the case may be, may be accomplished in any convenient manner as, for example, through the use of valved conduit means 54 in the nature of those used to inflate an ordinary, tube-containing automobile tire, and the said conduit means may extend as illustrated in FIG. 2 through openings provided therefor in the anchor block 38 or the steel ring 46, respectively.

In the utilization of the method and apparatus of this invention for the construction of a dome-shaped building shell utilizing, for example, concrete as the building material, steel for the construction of the reinforcing means 20, and anchoring means 36 in the nature of those depicted in FIG 2, the site is cleared and the anchoring means 36 constructed (or, in case of precast or prefabricated anchoring means, erected) and embedded in the ground as described hereinabove to, in this instance, define the generally circular, ground-level border of the dome-shaped building to be erected.

This ground-level border need not be circular, but may instead take any one of a wide variety of shapes as, for example, that of a square, a rectangle, a trapezoid, etc.

Either before or after this has been accomplished, any convenient means to supply compressed air at relatively low pressure to the area defined by the said anchor means are installed and may, for example, take the form depicted in FIGS. 4 and 5 wherein the same comprise readily transportable pump 56 which is capable of providing large volumes of air at relatively low pressures in the order of 0.03 atmosphere, and conduit 58 which connects the discharge of the said pump to the said area. The said pump is preferably of the readily reversible type whereby the reversal thereof will create reduced, rather than increased, pressure conditions in the conduit 58 for purposes described in detail hereinbelow.

Vibratory means 59 which are preferably of the acoustical or ultrasonic type are disposed as shown within the central portion of the said area, for purposes described in detail hereinbelow, and will include nonillustrated means to supply operational power thereto.

The uninflated balloon member 34 is then operatively positioned with respect to the anchor means 36 by the insertion of the deflated anchor ring 50 into the keyhole slot 40 provided therefor in the anchor block 38. The inner ring 52 is then inflated, as discussed above, to firmly anchor the balloon member 34 to the anchor block 38 and to provide a substantially air-tight seal therebetween, to in turn result in the provision of a substantially air-tight volume as defined by the respective inner surfaces of the balloon member 34, the anchor block 38, and the ground surface now enclosed therewithin.

To avoid the sticking of the concrete to the outer surface of the balloon member 34 upon the hardening of the former, and thus make more convenient the removal of the latter from the completed building as described in detail hereinbelow, the outer surface of the said balloon member may be quickly coated with any readily available lubricating material, as for example oil or petroleum jelly, or may, alternatively, include a layer or coating of a naturally lubricatory material in the nature of polytetrafluoroethylene and polytrifluorochloroethylene formed thereon.

At this juncture, the reinforcing means 20 are laid over the outer surface of the balloon member 34 in such manner that the outer ring 24 of the said reinforcing means substantially surrounds the entire outer surface of the said balloon member in the manner depicted in FIG. 4. The reinforcing means 20 are then secured to the anchor block 38 in obvious manner through the use of hooks 39.

With the balloon member 34 and reinforcing means 20 thusly disposed, the concrete, as indicated at 60 and preferably including an additive in the nature of Pozzolith or calcium ligninsulfonate to increase the viscosity thereof and to prevent the same from simply flowing off the surface of the balloon member 34 during the inflation of the latter, is poured to entirely cover the exposed surfaces of the still deflated balloon member and unexpanded reinforcing means, it being noted that more concrete is preferably poured toward the peripheral border of the balloon member 34, as indicated at 62 in FIG. 4, then is poured over the central portions of the latter to insure the presence of sufficient concrete in the peripheral area of maximum balloon expansion and of maximum stress insofar as the completed dome-shaped building is concerned. In addition, if necessary, this unever distribution of the concrete can be accomplished or completed by mechanical manipulation of the concrete after the pouring thereof to insure that the said concrete is distributed over the balloon member 34 in the depicted nonuniform manner. Proper inflation of the balloon member 34 will be insured by virtue of the temporary anchoring effect of the outer marginal portions thereof by the excess concrete 62 placed thereon, and a relatively uniform distribution of the concrete 60 thus provided for after full inflation of the said balloon member.

Operation of the pump 56 is then commenced to inflate the balloon member 34, and accordingly raise the reinforcing means 20 and the wet concrete 60. Ultimately the balloon member 34 together with the reinforcing means 20 and the wet concrete 60 will assume the form to which the balloon member has been previously shaped for full inflation to effect the erection of the shell indicated at 64 in FIG. 5. As shown, this shape is in the form of a dome, although other forms may be selected.

At this juncture, and before the concrete 60 has set to any appreciable degree, the vibratory means 59 are actuated to subject the interior of the dome-shaped shell 64 to vibrations, as for example at a resonant frequency thereof, in order to cause the water in the still wet concrete to move toward the balloon member 34 with resultant movement of some of the lighter constituents of the concrete, in the nature of some very fine aggregate and some cement, in the same direction. The migration of these constituents toward the surface of the balloon member 34 will function to drive off any entrapped air and will insure a proper adhesion of the reinforcing means 20 in the concrete to provide a substantially smooth interior shell surface with no portion of the reinforcement means 20 exposed. In addition, it may prove desirable to similarly vibrate the exterior of the shell 64 from externally disposed vibratory means in the nature of vibratory means 59 to effect a similar constituent migration toward the exterior surface of the still wet concrete 60 and resultant esthetically pleasing smoothness thereof. Alternatively, since the said exterior surface of the still wet concrete is exposed, the same may, if desired, be smoothed out in conventional manner through the use of conventional mechanical means in the nature of rollers or the like.

A different form of vibrating means are indicated at 61 in FIGS. 4 and 5 and, as shown therein, are connected directly to the reinforcing means 20 so that operation of the former will result in vibration of the said reinforcing means to again insure proper embedment thereof in the concrete. The vibratory means 61 may be used in conjunction with, or in lieu of, vibratory means 59 and may be connected to the reinforcing means 20 through the wet concrete prior to the inflation of balloon member 34, and removed from the said reinforcing means through the wet concrete after the balloon member 34 has been inflated and the said vibratory means 61 have been utilized. Although such removal of the vibratory means 61 may require the passage of a workman over the still wet concrete after the inflation of the balloon member 34, this presents no problem because the said balloon member is more than strong enough to support this temporary, additional load.

Suitable hardening of the concrete 60 is then effected whereupon the construction of the dome-shaped building shell 64 may be fully completed by the deflation and removal of balloon member 34, the disassembly and removal of fan 56 and conduit 58, and the removal of vibratory means 59.

The removal of the balloon member 34 from the hardened shell 64 may be accomplished in a variety of convenient manners, as for example, by the cutting of an access opening in the shell 64—which access opening will in any event be necessary to the inhabitation of the said shell—taking particular care not to cut the surface of the balloon member 34—operating pump 56 in reverse to deflate the balloon member 34, with this being made possible by the cutting of the said access opening which enables the introduction of air to the space formed between the outer surface of the said balloon member and the inner surface of the shell 64 as the former commences to deflate, deflating the balloon member anchor ring 50, manually removing the deflated balloon member 34 through the removal of the deflated anchor ring 50 thereof from the keyhole slot 40 in the anchoring means 36, and the removal of the thusly freed balloon member through the said access opening. This may then be followed by removal of vibratory means 59 and some portions at least of the conduit 52 through the said access opening to complete the shell erection operation.

Obviously, if desired, the balloon may be left as an integral portion of the structure, although such alternative will cause an increase in cost. Also access openings can be provided before the concrete is set, as by mechanically removing wet concrete from preselected areas and then laying forms over the cleared areas to prevent subsequent recovering thereof by flowing wet concrete. After setting and removal of balloon and form, the reinforcement can be cut in the cleared area to provide the opening.

If desired, the prestressing of the concrete 60 of shell 64 during the construction of the later may be readily effected by superinflating the balloon member 34 to place the reinforcing means 20 in tension after the latter have been fully expanded. This is made possible by the attachment of the reinforcing means 20 to the anchor block 38, through the use of hooks 39, whereby further inflation of the balloon member 34 after the reinforcing means 20 have been fully expanded will, of necessity, result in the placing of mesh 26 in tension as should be obvious. Thus, the hardening of the concrete 60 to form the shell 64 and the subsequent deflation of the balloon member 34 will place the said concrete in compression to result in the formation of a shell 64 of prestressed concrete with obvious advantage insofar as the strength characteristics thereof are concerned.

The remarkable savings in time made possible by the use of the construction method and apparatus of the invention in this instance are believed clearly illustrated by the facts that, once site clearance and construction of the anchoring means have been completed and the fan 56 operatively positioned relative thereto, the erection of a dome-shaped shell of approximately 12.5 meters in diameter requires only 30 minutes for full inflation of the balloon member 34 with a discharge pressure of only .3 p.s.i. from pump 56, 3 hours work on the part of 3 men to accomplish the manual smoothing out of the exterior shell surface— and less of course if vibratory means in the nature of 59 and/or 61 are available for this purpose—the unattended maintenance of the .3 p.s.i. pressure within the balloon member for approximately 24 hours thereafter through the closure, for example, of simple, nonillustrated valve means which may be incorporated in discharge conduit 58 in obvious manner, and the cutting of the access opening and removal of the balloon member etc. as described above.

A different form of reinforcing means is depicted in FIG. 6 and, as indicated generally at 70, comprises an inner ring 72 and an outer ring 74 joined by generally radially disposed flexible elements 76, preferably but not necessarily of chain link construction. Elements 76 are, in turn, joined at the center of the said reinforcing means, as indicated at 78, and to the said outer ring 74 at the respective intersections thereof as indicated at 80. In addition, a series of rings 82, having progressively decreasing diameters so as to be arranged at regularly spaced intervals between rings 74 and 72, are included, as are a series of flexible members 84 which are preferably of chain link construction and extend, as shown, in counter-directed pinwheel fashion, from the innermost of the rings 72 to the outer ring 74.

Each of the said flexible members 84 and rings 82 are secured, in any convenient manner, to the radially disposed flexible members 76 at every intersection thereof as indicated at 85. This provision of a path for each of the flexible members 84 which is inclined to an increasingly greater extent has been determined to provide, at each intersection point of the said flexible members, the best resistance to the stresses to which the structure to be erected will be subjected.

The construction of the reinforcing means 70 is completed by the laying thereunder of an extensible mesh-like structure 86, which, as shown in FIG. 7, is of a construction analogous to the construction of mesh 26 of the reinforcing means 20 of FIG. 1. The structure 86 is sized to underlie the entire surface of the reinforcing means 70 when the same are not expanded, and to be expandable to continue to underlie the entire surface of the reinforcing means 70 upon the expansion of the latter.

Other forms of the balloon member and anchor means are indicated at 90 and 92 respectively in FIGS. 8 through 10. The balloon member 90 is generally similar to the balloon member 34 in also being inflatable into the shape desired for the structure to be constructed but, in place of the anchor ring 50 of the latter, includes a plurality of eyelets 94 formed in the manner best seen in FIG. 8 adjacent the edge portion thereof and extending therethrough to enable the attachment of the balloon member 90 to the anchor means 92 as described hereinbelow. As a result of the extension of the said eyelets through the balloon member 90, means must be provided to render the latter airtight and this is accomplished by the inclusion of a bottom portion or floor 96 which is affixed to the balloon member 90 above the level of the eyelets 94, in the manner indicated at 98 in FIG. 8. This is believed made clear whereby the interior volume of the balloon 90 will be airtight despite the eyelets 94.

For use with a balloon member in the nature of balloon member 90, the anchor means 92 will preferably comprise an anchor block 93 which includes a plurality of spaced hooks 95 extending upwardly therefrom for cooperation with the eyelets 94 to secure the balloon member 90 to the said anchor block. Alternatively, the said hooks may of course be attached to the said balloon member and means, as for example, an exposed rod disposed slightly above the upper surface of anchor block 93 and connected thereto at spaced points, provided to enable the "hooking" of the balloon member hooks to the anchor block.

Elastic sleeves 99 are provided in the central portion of the floor 96 of the balloon member 90, whereby the discharge end of the conduit 58 may be forced therethrough to provide an airtight seal therebetween and enable inflation of the balloon member 90. Although by no means essential to the practice of this invention, a floor as indicated at 100 in FIGS. 8, 9 and 10 may be constructed prior to the construction of the building shell and, in cases where the material utilized in the construction thereof and of the anchor means 92 is a settable material in the nature of concrete, the said floor may be constructed integrally with the said anchor means at the construction site in the manner illustrated by the said figures.

With the exception of the additional steps required for the insertion and removal of the discharge end of conduit 58 into the sleeve 99 provided in the balloon member floor 96 by the elastic sleeve 99, the construction of a dome-shaped building shell utilizing the reinforcing means 70 of FIG. 6, and the balloon member 90 and anchor means 92 of FIGS. 8, 9 and 10, will be substantially the same as that described hereinabove with reference to FIGS. 1 through 5, inclusive, and will again involve the anchoring of the edges of the uninflated balloon member 90 to the anchor means 92, the proper placement of the reinforcing means 70 relative to the said balloon member and anchor means, the pouring of the concrete 60 thereover in the same manner described hereinabove, the inflation of the balloon member 90 through the use of pump 56, and subsequent treatment of the unhardened concrete shell and removal of the balloon member 90 and portion of conduit 58 as described hereinabove.

That the method of this invention will find ready utilization in the construction of structures other than buildings is believed made readily apparent by FIG. 11, wherein is depicted the construction of an arch 101 through the use of a balloon member 34 and anchor means 36. To this effect, guide means generally indicated at 102 which, upon the inflation of balloon member 34 in the hereinabove described manner, form the outline for the arch 101, are affixed as indicated to the outer surface of the balloon member. To avoid making the balloon member 34 unduly cumbersome and heavy, the guide means 102 may be constructed in the form of an inflatable ring 103 in the nature of anchor ring 50 (FIG. 2) whereby the ring 103 could be inflated along with the inflation of the anchor ring 50 of the balloon member 34.

In this instance, the reinforcing means would most probably be constructed of steel, for greater strength, and formed so that in the unexpanded condition thereof they would conform to the outer surface area of the uninflated balloon member 34 defined by the guide means 102 and, in the expanded condition thereof, they would conform to the same but now expanded outer surface area of the now inflated balloon member 34.

Thus, the construction of the arch 101 would require the anchoring of the edges of balloon member 34 to the anchor means 36, the inflation of the guide means 102 to provide a satisfactory border for the area to be occupied by the reinforcing means 20 and concrete, the placement of the said reinforcing means within the said area, the pouring of the said concrete only over the said area with more concrete again being poured over the portions near the periphery of the balloon member 34 than over the central portions of the latter, the inflation of the balloon member 34 to raise the concrete to the arch-forming position thereof depicted in FIG. 11, the treatment of the unhardened concrete as before, and the subsequent removal of the balloon member 34 and related equipment as above. Such an arch may be employed in the arch-supported bridge of FIG. 12 which, after completion of the arch 101, would require only the construction and placement, in conventional manner, of the bridge span 104 upon the thusly constructed arch 101.

With the nonillustrated reinforcing means utilized in the construction of the arch 101 secured to the balloon member anchor means at the respective junctures thereof through the use, for example, of hooks in the nature of hooks 39 of FIG. 2, superinflation of the balloon member 34, will, of course, result in the prestressing of the concrete which forms the finished arch to thus provide an arch with increased strength characteristics.

There are two problems which arise from the utilization of thin shelled structures in the nature of those constructed by the method of this invention. The first of these problems is that a thin shelled structure, and especially one of steel reinforced concrete, is a good thermal conductor whereby a building formed thereby may be too hot in the summer and too cold in the winter. Moreover, such a structure is likely to promote undesirable condensation on its interior surface. The second of these problems revolves around the fact that a thin shelled structure, and especially one of substantially dome-shape as illustrated by FIG. 5, displays a marked acoustical tendency toward reverberation and echoing.

The acoustical problem finds satisfactory solution through the "breaking up" of the dome-shaped interior and this can be readily accomplished through the use of the method of this invention, by attaching one or more balloon members of substantially smaller diameter, as indicated at 106 in FIG. 13, over the balloon member 34 after the same has been covered by the reinforcing means 20 and the concrete 60 poured thereover. The balloon member 106 includes a completely enclosed volume therewithin whereby the inflation thereof does not require edge anchoring in the manner of balloon member 34. Instead, the balloon member 106 includes a valved conduit member 109 extending therefrom to enable the convenient inflation thereof from any convenient source of compressed air as indicated by an air line 110.

The attachment of balloon member 106 over the concrete covered but uninflated balloon member 34 is accomplished by utilizing generally nonexpandable reinforcing means 112 to cover the balloon member 106, and attaching these reinforcing means through the wet concrete to the reinforcing means 20. Then, additional concrete is poured to completely cover the balloon 106 and nonexpandable reinforcing means 112. After this is done, the main balloon member 34 is inflated as previously described and, after this inflation is achieved but before the setting of the concrete, the small balloon is inflated to move inwardly and distort the balloon member 34 and cause it to also move inwardly.

The balloon member 106 is prevented from moving outwardly as a result of the inflation thereof by the nonexpandable reinforcing means 112, but can move inwardly to distort the readily expandable reinforcing means 20 and the balloon member 34 in the inward direction since this inward movement results only in flexure of the balloon member 34 which flexure, at this time, can be resisted only by the force of the slightly compressed air within the balloon member 34. As a result all that is required to accomplishd this inward movement is that the compressed air utilized to inflate balloon member 106 be at a higher pressure than the compressed air utilized to inflat balloon member 34.

Thus, the hardening of the concrete 60 will result in the formation of a dome-shaped shell 64 as above comprising, in this instance, a space 113 and a protrusion or "bump" 114 which forms the said spaced and projects into the interior of the said shell to provide the desired, improved acoustical properties. Then, after removal of the balloon member 34 as above, the valved conduit 109 may, if desired, be removed along with balloon member 106 through the aperture formed in the shell 64 by the presence of the said valved conduit—which removal may require enlargement of the said aperture through the use of conventional, concrete drill means with attendant destruction of the said valved conduit and balloon member 106. Furthermore, whether or not balloon 106 is removed from space 113, if desired, a thermal insulating material of any convenient type may be introduced into the space 113 through the said aperture to provide for thermal insulation. Although the introduction of the constituents of polyurethane foam into the space 113 and the resultant foaming thereof and filling of the said space have proven particularly desirable from a convenience and a thermal insulation point of view, it is believed apparent that other thermal insulating means in the nature of rock wool or such may also be employed for this purpose.

Alternatively, the valved conduit 109 and balloon member 106 may be removed as above and a hole drilled through protrusion 114 to communicate the interior of the shell 64 with the space 113 to provide an updraft type of ventilation through the said space to the atmosphere. This ventilation would act as an excellent means of reducing condensation and constitute a most satisfactory thermal barrier.

FIG. 14a illustrates a somewhat different method for use in the formation of a dome-shaped shell 64 comprising a space 113 and a protrusion 114 which forms the space and projects into the interior of the shell. In this instance, the valved conduit 109 of the balloon member 106 extends as illustrated through a sleeved aperture provided therefor in the balloon member 34 into the fluid-tight interior of the latter. In the use of this method, the air line 110 (FIG. 13) which is utilized to supply compressed air for the inflation of the balloon member 106, would preferably extend from outside the fluid-tight interior of the balloon member 34, underneath the anchor means 36 in the manner of conduit 58 (FIG. 4) into the fluid-tight interior of the balloon member 34, and would be connected therein to the valved conduit 109 to thus enable the inflation of the balloon member 106 in the manner described hereinabove.

Figure 15:
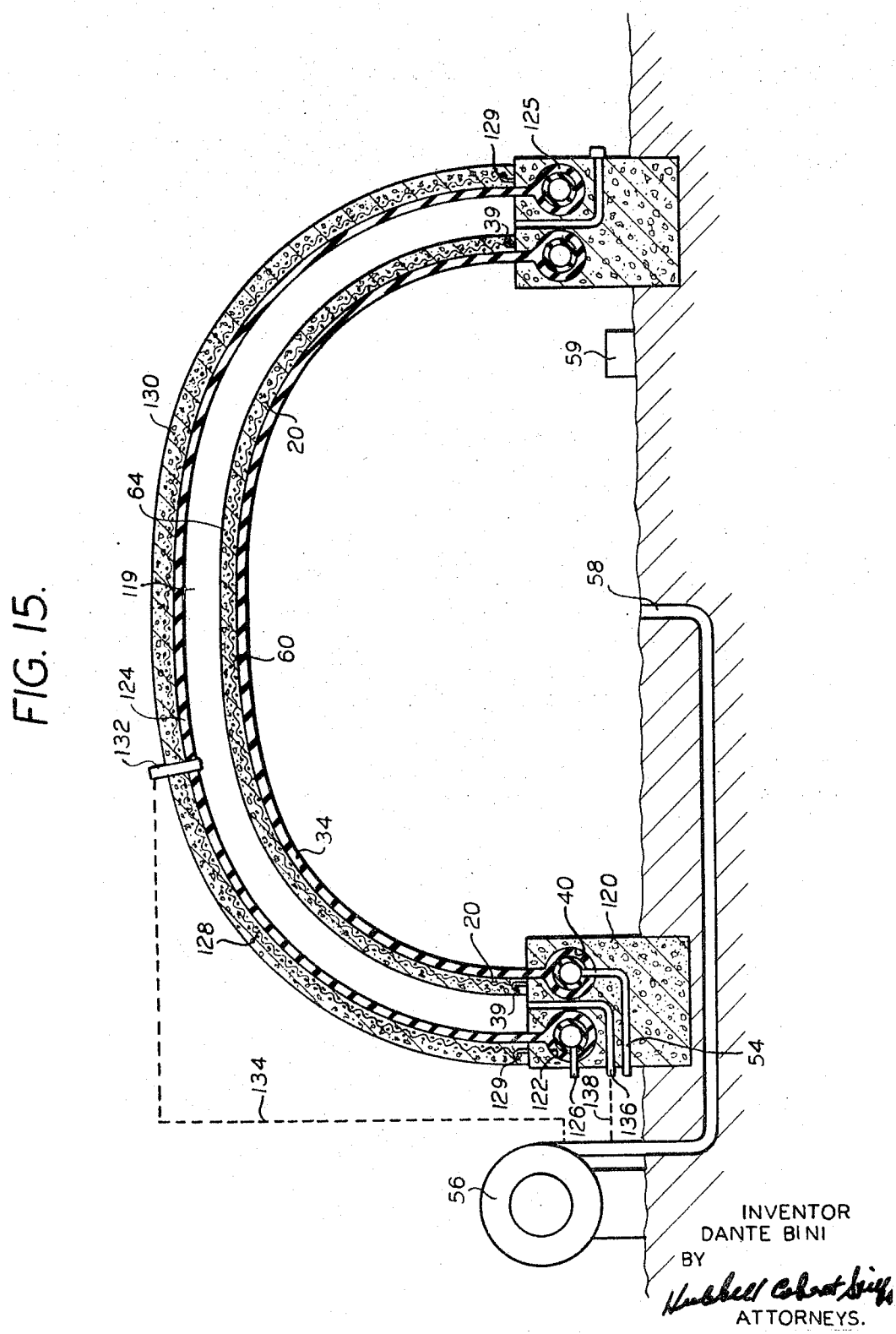
FIG. 15 is a vertical cross sectional view illustrating the construction of still another form of dome-shaped structure.
Figure 28:
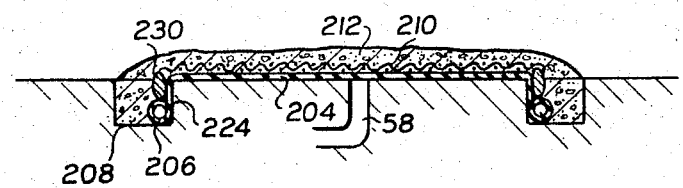
FIGS. 28, 29, 30 and 31 are a series of diagrammatic views illustrating a method of constructing a twin shelled structure utilizing a single stretchable balloon.

FIG. 15 illustrates a utilization of the method of this invention whereby a space 119 in the nature of space 113 of FIG. 14 may be made substantially coextensive with the interior surface of balloon member 34 so as to, in effect, provide a double-wall shell structure. This is effected through the use of an anchor block 120 which includes an additional keyhole-type slot 122 formed therein as shown adjacent the keyhole-type slot 40, and will, in addition, require the use of a second balloon member 124 which includes an anchor ring 125 inflatable through valved conduit 126 and, when deflated, covers a slightly larger area than deflated balloon member 34 and, when inflated, encloses a somewhat larger volume than balloon member 34 to provide a space therebetween.

A second reinforcing means 128 which, in the manner of balloon member 124, covers a somewhat larger area than reinforcing means 20 and is expandable to a somewhat greater extent, will also be required.

The construction of what in this instance may be termed the "inner shell" 64 is effected in the manner described above with balloon member 34 being affixed, in air-tight manner, in keyhole-type slot 40 of anchor block 120 through the use of valved conduit 54, reinforcement means 20 placed thereover and secured to the anchor block through the use of the hook 39 the concrete 60 poured thereover with care being taken not to allow the concrete to run into and clog the keyhole-type slot 122, the balloon member 34 inflated to result in the formation of shell 64, and the treatment of the unhardened concrete through the use of vibratory means 59.

After the shell 64 has hardened to an extent sufficient to permit contact therewith without resultant damage thereto, the outer balloon member is placed thereover and secured in air-tight manner in the keyhole-type slot 122 of the anchor block 120 through the use of anchor ring 125 and valved conduit member 126 to thus provide a substantially air-tight and readily expandable space 119 between the outer surface of the shell 64 and the inner surface of the said balloon member 124.

The reinforcing means 128 are then placed over the balloon member 124 and secured to the anchor block through the use of hooks 129, and the concrete which is to form what in this instance may be termed the "outer shell" 130 then poured thereover.

Inflation of the balloon member 124 through the introduction of air under slight pressure to the space 119 between the shell and balloon member 124 is then required and may be effected in any one of a variety of convenient manners. Thus, for example, the balloon member 124 may include valved conduits 132 extending therethrough and therefrom as shown for communicating air from the discharge conduit 58 of fan 56 to the space 119 as indicated by the dashed line extending between the said discharge and valved conduits, respectively. Alternatively, valved conduits 136 may be included in anchor block 120 and extend therethrough to communicate the fan discharge conduit 58 with the space 119, as indicated by the dashed line 138 extending therebetween. As another alternative, the balloon member 34 could be removed from hardened shell 64 in the manner described hereinabove through the cutting of an access opening in the latter and the deflation of anchor ring 50 and the said balloon member prior to the placement of balloon member 124 over the said shell. Thus, the placement and sealing of the anchor ring 125 of balloon member 124 in keyhole-type slot 122 would result in the creation of two air-tight spaces, i.e., the space defined by the interior of the shell 64, and the space 119 between the exterior of shell 64 and the inner surface of balloon member 124, with the said spaces being communicated by the said access opening, whereby the introduction of compressed air through pump discharge conduit 58 to the interior of the shell 64 would function to fill the interior and, by virtue of the said access opening, inflate the balloon member 124 through the filling of space 119.

After the balloon member 124 has been fully expanded to create the space indicated at 126, the concrete supported thereby which now forms the outer shell 128 is vibrated and smoothed as above and left to harden to thus complete the formation of the twin shelled structure.

Removal of the respective balloon members 34 and 124, assuming the former has not yet been removed and no access openings yet cut in shell 64, may then be readily effected by cutting an access opening in shell 130, deflating balloon member anchor ring 125 through valved conduit 126 and then deflating balloon member 124, removing the balloon member 124 through the said access opening, extending the said access opening through shell 64, deflating anchor ring 50 and then deflating balloon member 34 and lastly removing the balloon member 34 through the second access opening.

Alternatively, the construction of the respective shells 130 and 64 may be effected by first positioning the reinforcing means 20 on the anchor block 120 without attaching the former to the latter through the use of hooks 39. The outer balloon member 124 is then placed thereover and secured as above in air-tight manner in keyhole-type slot 122, the reinforcing means 128 then placed over the outer balloon member 124 and secured to the anchor block 120 through the use of hooks 129, the concrete then poured thereover as above, and the outer balloon member 124 inflated through discharge conduit 58 to form the outer shell 130.

After the outer shell 130 has been treated and hardened, an access opening is cut therein and the outer balloon member 124 removed therefrom as above.

The inner balloon member 34 is then introduced to the interior of the outer shell 130 through the said access opening, and placed under the reinforcing means 20 already disposed therein. The inner balloon member 34 is then secured as above in air-tight manner in keyhole-type slot 40, and the reinforcing means 20 then properly disposed thereover and secured to the anchor block 120 through the use of hooks 39.

The concrete is then introduced, in any convenient manner, through the access opening in outer shell 130 and disposed, in proper manner, over the inner balloon member 34 and reinforcing means 20, and the former then inflated through discharge conduit 58 to form the inner shell 64. As the inner balloon member 34 is inflated, the access opening previously cut in the outer shell 130 will make possible the ready escape of the air from the space formed between the surface of the wet concrete 60 atop the inner balloon member 34 and the inner surface of the now completed outer shell 130.

Once the inner shell 64 has been treated and hardened an access opening may be cut therein, through the use of the access opening in the outer shell 130 and the portion of space 119 aligned therewith, the inner balloon member 34 is deflated and removed as above through the respective access openings to complete the formation of the double walled structure of FIG. 15. It is believed readily apparent that if the directly hereinabove described method is utilized in the construction of the said double walled structure, neither of the valved conduits 136 which extend through anchor block 120, nor the valved conduit 132 which extend through the outer balloon member 124, need be provided in that the construction of the outer shell 130 before the construction of the inner shell 64 makes possible the direct use of discharge conduit 58 to inflate both of the said inner and outer balloon members.

It is also obvious that the inner balloon 34 could be disposed under the reinforcement 20 prior to construction of the outer shell, rather than introducing the inner balloon 34 subsequent to inflation of outer balloon 124 and the setting of shell 130. In such instance the inflating air for outer balloon 124 must be introduced above inner balloon 34 as by conduit 136. Moreover, if the outer shell is constructed first, after removal of outer balloon 124, the inner balloon can be secured in the annular slot 122 which is freed by the removal of the outer balloon, whereby to obviate the necessity for slot 40.

Filling of the space 119 with thermal insulating material, or the venting thereof to both the interior of shell 64 and the atmosphere, may then be accomplished to, in either event, provide a structure with excellent thermal properties, albeit one with relatively poor acoustical properties which may be improved by any of the methods described hereinabove. With regard to the said relatively poor acoustical properties, it is to be noted that the method described in detail hereinabove in conjunction with FIGS. 13 and 14 may be utilized in the construction of the shell 64, prior to the construction of the shell 130, to provide a shell 64 which includes one or more protrusions extending into the interior thereof with resultant significant improvement in the acoustical properties of the building. Thus is believed made clear whereby the use of a combination of the method described in conjunction with FIGS. 13 and 14, and the method described in conjunction with FIG. 15, will result in a building with good thermal properties and good acoustical properties.

Alternatively, good acoustical properties may be provided in the case of either single or double shell buildings through the use of a balloon member in the nature of 34 of very elastomeric construction whereby the said balloon member, being readily deformable will, during the inflation thereof, tend to move into the openings in the reinforcement means 20 provided by the mesh construction 26 of the latter to thus provide the interior of the shell with a three-dimensional scalloped appearance of the nature illustrated in FIG. 16. This scalloped appearance will, of course, provide excellent acoustical properties for the shell and may be readily incorporated in the method of construction of a double shelled building by the use of a balloon member 34 which is readily deformable for the described purposes.

Superinflation of either one, or both, of inner balloon member 34 and outer balloon member 124 may of course be utilized during the construction of the double walled structure of FIG. 15 by any of the above-descrbied methods, to result in the prestressing, as described in detail hereinabove, of the concrete of either one, or both, of the inner shell 64 and the outer shell 130.

Utilization of the method of this invention for the construction of the roof portion, only, of a building is illustrated by FIGS. 17 and 18 and, as seen therein, comprises the use of a balloon member 34, of the nature described hereinabove, which includes guide means 140, of the nature of guide means 102 as described hereinabove in conjunction with FIG. 11, secured to the outer surface of the said balloon member to provide a border for defining the outline of the said roof portion.

In the construction of such roof portion, reinforcing means 142, which are expandible upon inflation of the balloon member 34 into the shape of the said roof portion, are utilized, with the construction of the latter requiring the placement of the said reinforcing means within the confines of the guide means 140, the pouring of the concrete thereover again within the confines of the said guide means, and the inflation of balloon member 34 to form a roof portion 144 (FIG. 18) of the desired shape, and at the desired height thereof. After the said roof portion has hardened and, of course, before deflation of the balloon member 34, structural support means 146 of any desired construction are placed as illustrated in FIG. 18 to support the roof portion 144 upon the deflation and removal of balloon member 34. Thus, the said deflation and removal will result in the structure of FIG. 18 which may be left as is for use as a partially open-air structure, or alternatively, further enclosed by the use of conventional construction methods.

Alternatively, the structural support means 146 may also be constructed of reinforced concrete through the use of the method of this invention, concurrently with the construction of roof portion 144, by the utilization of guide means in the nature of 140 which define the borders of the said support means upon the inflation of balloon member 34, and of reinforcing means which are expandable to substantially the shape of the said support means upon the inflation of balloon member 34. In this instance, inflation of balloon member 34 after the placement of all of the reinforcing means and concrete thereon within the borders defined by all of the guide means, would result in the formation of both the roof portion 144 and the support means 146.

Although structures as disclosed hereinabove in the form of domes or what may be referred to as "spherical cupolas" represent the best solution to the problem of load distribution in that no other structural form is capable of bearing as great static and dynamic loads per unit of cross section, it is to be clearly understood that by constructing the balloon members and reinforcing means to assume other forms upon the separative inflation and expansion thereof, other structural forms can be achieved. Thus, for example, structures of substantially solidly rectangular form can be obtained through the use of balloon members and reinforcing means expandable thereto, although the said rectangular form structures would, in all probability, be somewhat bowed out. One especially desirable non-hemispheric form structure would be a structure of substantially semi-cylindrical form that would have an especially useful shape for the provision of in door tennis courts or the like.

It is also to be clearly understood that, within the realm of practicability, there is no absolute limit to the size of the structure which may be erected through the use of the method and apparatus of this invention, it being noted that the larger the said structure and, as follows, the area of the balloon member, the greater the force that will be exerted by the said balloon member for a given inflation pressure, and hence the greater amount of building materials that can be lifted by the said balloon member. In the construction of concrete structures, a critical factor would be the strength of the concrete in compression, once it has set, it being noted, however, that this can be controlled, within limits, by the thickness of the structure being constructed and by the type and strength of the employed reinforcing means. In addition, if desired, supplementary bracing means in the nature of conventional steel brace-work could be incorporated to provide additional bracing for a very large structure in the nature of a dome to provide additional strength thereto. Thus, it would not appear beyond the realm of this invention that the method and apparatus thereof could find satisfactory and most economical utilization in the construction of very large structures in the nature of domed stadiums or the like.

It has heretofore been suggested in this specification that it is desirable for the central part of the dome to be raised first during the inflation of the balloon and that the raising thereof move out radially as additional air or other fluid is pumped underneath the balloon. As shown in FIG. 4, this form of upward movement resulting from inflation can be achieved by distributing the concrete so that there is a relatively thin layer overlying the central portion of the deflated balloon with a thicker layer of concrete near the marginal edge. While such a means for achieving the desired inflation characteristic works satisfactorily for relatively small structures, it has been found that for larger domes of the order of one hundred feet in diameter or greater, the desired inflation characteristic is difficult to achieve in this manner.

To obtain the desired inflation characteristic, a supplementary balloon may be employed for first raising the central portion of the main balloon and the reinforcement and concrete overlying it. This illustrates in FIGS. 19 through 21 whereinan inflatable balloon 34 is secured in previously described manner to an anchor block 38 with an expandable reinforcement 20 overlying the balloon and wet concrete overlying the balloon and reinforcement. A pair of conduits 58 are provided to pass air or other fluid into the interior of the balloon 34 to inflate the balloon.

In accordance with the present modification, a supplementary balloon 150 connected to a conduit 152 is disposed under the central portion of the primary balloon 34. Balloon 150 may be made of any suitable air impervious material as has already been discussed with respect to balloon 34. However, it should be noted in FIGS. 19 through 21 that the balloon is a complete enclosed structure excepting for the outlet which is attached to the conduit 152. It may or may not be anchored, as desired.

After the assemblage is arranged in accordance with FIG. 19, air or other suitable fluid is supplied to the interior of balloon 150 through conduit 152, whereby to inflate the balloon 150 and raise the central portion of the balloon 34 and the reinforcement and concrete overlying said central portion. This will insure that no part of the peripheral or margin portion of the main balloon 34 will tend to become raised in advance of the central portion. FIG. 20 illustrates the structure in an intermediate portion of its erection.

At a point in the erection of the structure in accordance with the method illustrated by FIGS. 19 to 21 where the central portion is sufficiently high to assure that it will remain upward of the marginal portions of the balloon 34, air or other fluid is supplied to conduits 58 whereby to inflate the balloon 34 to complete the structure in the previously described manner. The inflation of the primary balloon 34 can be such as to take over the entire elevation of the structure or, in the alternative, as shown in FIG. 21, balloon 150 is applied with sufficient inflating fluid so as to continue to contribute to the lifting of the central portion of the primary balloon 34 throughout the entire erection of the structure.

A modification of the method of FIGS. 19 through 21 is illustrated in FIGS. 22 and 24 wherein the secondary or supplementary balloon is not a self-contained air-tight structure as was the balloon 150 but, instead, is itself a balloon quite similar to the primary balloon 34 which is anchored to an anchor block in the same manner in order to make an air-tight structure. Referring now to FIG. 22, a sheet-like balloon 154 of relatively small diameter is disposed beneath the ordinary primary balloon 34 and is secured in air-tight relation to the ground or substructure by an anchor block 156, in the manner described hereinbefore with respect to the balloon 34. After disposition of the parts in the standard manner with the secondary or supplementary balloon 154 underlying the central part of the main balloon 34, air or other inflating fluid is supplied to the interior of the secondary balloon 154 through conduit 152, whereby to elevate the central portion of the balloon 34 and the reinforcement and concrete overlying said portion. This will elevate the structure to the condition shown in FIG. 22 in which condition there is reasonable assurance that the structure will inflate in a stable fashion with the central portion at maximum elevation when air is supplied through the conduits 58 to the interior of the balloon 34. Air is then supplied through the conduits 58 to raise the balloon and its overlying reinforcement and the concrete to the condition shown in FIG. 23, the secondary balloon 154 playing no part in the final elevation of the structure. Of course, if desired, the balloon 154 could be shaped to remain in contact with the central portion of the balloon 34 throughout the entire erection in the same manner as the balloon 150 operates as above described. In either event the danger of a marginal portion of the primary balloon 34 being elevated prematurely to cause an undesirable shift in concrete is substantially eliminated.

Referring now to FIG. 24 a modified form of stretchable and expandable reinforcement for inclusion in structures erected in accordance with the present invention is illustrated. The reinforcement is generally designated by the reference numeral 158 and is made of suitable material such as steel wire that has been formed into a helical coil. The coil (or otherwise bent) steel wire 162 is arranged in a square grid as shown in FIG. 24. When such a square grid overlies an inflatable balloon and the balloon is expanded, the natural resilience or springiness of the coiled steel wire 162 will permit the reinforcement 158 to expand and thereby assume the shape of the expanding balloon. In addition to a number of advantages of this type of construction as will be described hereinafter, the stretched coiled grid 158 will tend to prestress the concrete dome which will add to the overall strength of the completed structure.

In accordance with the preferred form of making the reinforcing grid 158, coiled steel wire 162 is first laid back and forth over a balloon. For example, the coiled spring wire 162 can be run along the first horizontal course 164 and thence down along the peripheral portion of the balloon 166 and thence back along the horizontal path 168, thence along the peripheral portion 170 of the balloon and thence rightward along the path 172 and so forth. A second wire 174 can be anchored along the periphery of the balloon and thence run vertically as viewed in FIG. 24 along the path 176 and thence along a peripheral portion of the balloon 178 and then vertically upwardly along the path 180 and then along a peripheral portion of the balloon 182 and then outwardly along the path 184 and so on. This second wire 174 will overlie the first mentioned wire 162. If desired, a third horizontal wire 186 can be run back and forth over the wire 174 and in between the horizontal courses of the wire 162. Likewise, thereafter, a second vertical wire 188 can be run over a second horizontal wire 186, and back and forth in a vertical direction (as viewed in FIG. 24) between the vertical courses of the first mentioned vertically running coiled wire 170. This may be repeated a number of times if desired to build up an interleaved structure of criss-crossing wires that is strong and stretchable and will effect a resultant adhesion to the concrete layer 60 that is poured over it. The grid 158 can be used in substantially any modification of the present invention heretofore described.

Referring now to FIG. 25, a modified form of coiled wire grid is shown. This coiled (or otherwise bent) wire grid is generally designated by the reference numeral 190 and is of a polar type grid construction made up of one or more spirally running spring wires and a plurality of radially extending coiled wires. Preferably the polar grid is constructed with a plurality of spirally running coiled wires interleaved with several sets of radially extending wires to thereby give the same layered construction as above described with respect to FIG. 24. For example, a first spirally running coiled wire 192 can be laid over a balloon. Then a first set of radially extending coiled wires 194 can be run over the coiled wire 192 and connected at both ends to said coiled wire preferably. Then a second spirally running coiled wire 196 can be run in between the convolutions of the coiled wire 192 and over the set of radially extending coiled wires 194. Then a second set of radially extending wires 196 disposed angularly between the radially extending wires 194 and over the spirally running coiled wire 196 may be disposed in position. The ends of the radially extending wires 196 may be secured to the grid at the center thereof and at its periphery in any suitable fashion. The outer ends of the spirally running wires 192 and 196 may be secured to adjacent portions of the spirally running wires 196 and 192, respectively. Additional layers of this polar grid can be constructed in accord with this teaching. Such a stretchable reinforcement has substantially the same advantages as the stretchable reinforcement 158 previously described.

It will be recognized that either of the stretchable reinforcements 158 and 190 can be constructed in situ immediately over the balloon or may be prefabricated away from the site and then brought to the site ready to be used. Which manner of construction should be adopted will depend upon specific economic factors in each individual case.

Either of the stretchable reinforcements 158 and 190 gives rise to the possibility of constructing a building that is not completely hemispherical in configuration. This desirable result stems from the fact that means can be incorporated in either of the grids 158 or 190 for limiting the amount of expansion of certain portions of said grids without affecting the stretchability of other portions thereof. For example, and as shown in FIG. 26, a coiled wire reinforcement 160 can be limited in the amount of its stretch by threading through the turns thereof a non-stretchable wire 198 whereby to limit the maximum length of the wire 160 to the length of the wire 198. If a wire 198 were for example, run through certain portions of the spirally running wires 192 and 196, as shown in FIG. 25, when a balloon 34 was inflated to erect a building 202 it would take the shape shown in FIG. 27. This gives far more versatility to the structural system described herein.

Heretobefore in this specification there has been described the construction of buildings employing nylon reinforced neoprene balloons or the like. Such balloons are substantially non-stretchable and it has been discovered that as a result of the non-stretchability that unequal elevation of different portions of the balloon arises during inflation thereof which unequal elevations tend to cause instability and an undesired shifting of concrete. These problems, as already noted, are particularly burdensome in large domed structures. Means have been described hereinbefore for eliminating this problem. Such means, as will be recalled, may be unequal distribution of concrete as shown in FIG. 4 or the use of secondary balloons 150 and 154 as shown in FIGS. 19 through 23.

It has been found that the problem of instability and concrete shifting during the erection of a concrete structure by inflation as described herein can be substantially eliminated by the substitution of a stretchable balloon 34 for a nonstretchable balloon. Many materials are available to make such stretchable balloons. For example, rubber, ethylene propylene terpolymer, ethylene-propylene copolymer, and other synthetic rubbers such as, for example, GRS may be employed to provide such stretchable balloons. By substituting a stretchable balloon for nonstretchable balloon, the balloon may lie flat on the ground prior to inflation (without any folds or pleats as shown for example in FIG. 19) so as to insure a smooth distribution of concrete thereover and an even and suitable erection of the structure during inflation of the stretchable balloon. This is particularly so when the modulus of elasticity of the stretchable balloon material is sufficiently high so that the force required to stretch the balloon is a significant portion of the total force required to stretch the balloon and elevate the concrete and reinforcement.

Another advantage of a stretchable balloon is the ease with which it will yield nonspherical structures. For example, a stretchable balloon member of rectangular configuration can be employed and it will, upon inflation, assume a configuration that may be best described as a curvilinear pyramid. A similar three faceted curvilinear pyramid can be achieved by using a triangular shaped balloon member. Thus the present invention is not restricted to spherical domed structures.

It will be understood that the stretchable balloon is a particularly desirable type of balloon to employ with the stretchable reinforcements 158 and 190 particularly when it is desired to make an irregularly shaped structure such as, for example, the structure 202 of FIG. 27. The combination of stretchable balloon and stretchable reinforcement thus gives rise to great versatility.

As an illustration of the versatility of such a system, another method of making a double shelled structure is illustrated in FIGS. 28 through 31. In accordance with that method a conduit 58 is run to the interior of the structure to be built to supply inflating air or other fluid thereto. Thereafter, a stretchable balloon 204 is laid over the conduit outlet and the portion of the base or support to be enclosed by the structure to be built. A toroidal end 206 of the stretchable balloon 204 is anchored in toroidal anchor block 208 which may be constructed in accordance with any of the previous forms of anchor blocks but is here shown to be a modified construction to be described hereinafter. Thereafter, a reinforcement 210 preferably of the stretchable type of FIGS. 1 or 6 is laid over the stretchable balloon and anchored and thereafter concrete or other hardenable material 212 is poured over the balloon 204 and reinforcement 210 and relatively evenly distributed.

Figure 29:
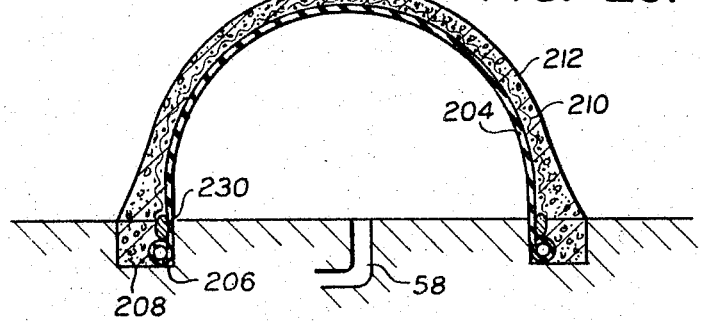

Then air is supplied to the interior of the balloon 204 to inflate the balloon and thereby raise the reinforcement 210 and the concrete 212 to, for example, the shape shown in FIG. 29. The compressed air is kept within the balloon 204 until the concrete sets sufficiently to separate itself and the reinforcement whereupon the balloon is deflated and separated and brought back to its initial position as may be seen in FIG. 30.

Figure 30:
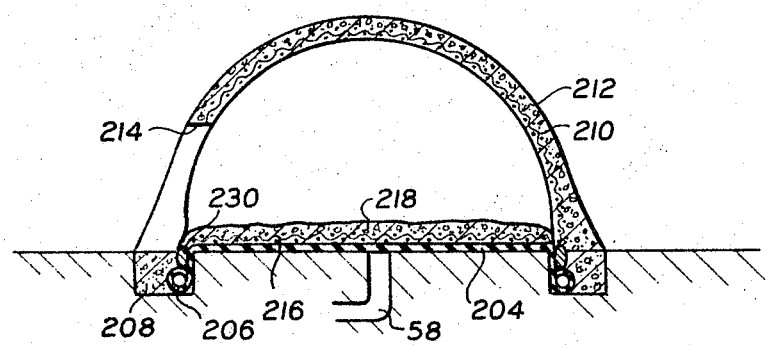
Figure 31:
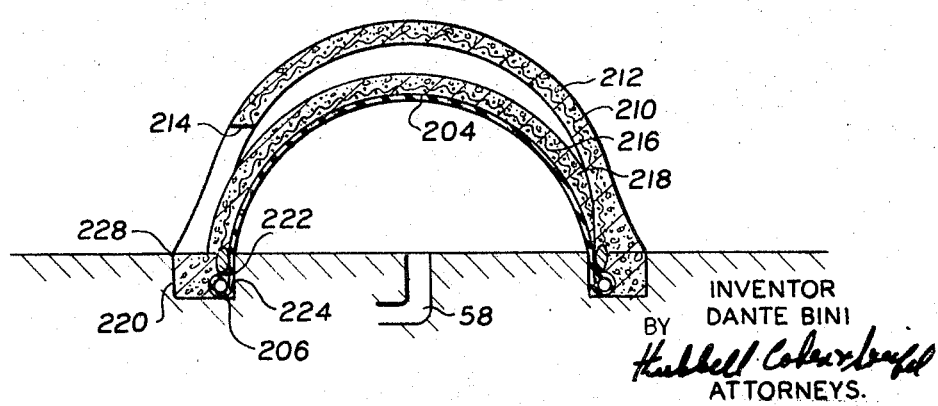

Then an access opening 214 is cut in the shell composed of concrete 212 and reinforcement 210 to gain entrance into the interior of that shell. With access so gained, a second expandable reinforcement 216 of whatever type is disposed or constructed within the interior of the now finished shell, and concrete or other suitable hardenable material is laid over the reinforcement 216 and the balloon 204 as shown in FIG. 30. Thereafter the balloon 204 is reexpanded but this time to a lesser extent than the initial expansion, whereby to construct a second dome made of the reinforcement 216 and the concrete 218 that is disposed interiorly of the first constructed dome. The balloon 204 is maintained inflated a second time until the second or inner shell sets and then is once again deflated and this time removed from the structure.

Thus, by using a stretchable balloon 204, there is no need to utilize two balloons to make a twin shelled structure as shown in FIG. 15. This results in a substantial saving in cost both from the elimination of the need of a second balloon, a second anchor block, and the labor required to dispose of the second balloon described in connection with FIG. 15.

As previously mentioned in connection with FIGS. 28 through 31, a different form of anchor block is utilized therein although this form of anchor block may be employed in connection with any structure and method described in this application. In the previous anchor blocks of FIGS. 2 and 3 for example substantial time and expense is required to fabricate them. It has been discovered that the anchor block can be constructed on site. This is achieved by digging or otherwise providing a toroidal trench 220 large enough to receive the inflated toroidal end 206 of the balloon 204 whether or not that balloon is stretchable). A plurality of boards are brought into surface engaging relation with the portion of the balloon 204 immediately adjacent the toroidal end 206 to force said adjacent portions of the balloon against the inner wall 224 of the trench. Thereafter a number of spaced apart sticks or boards are wedged in between the outer surface 228 of the trench 220 and the boards to hold said boards in the described and illustrated positions. Steel reinforcing members may be disposed in the trench to extend both upwardly for connection to the expandable metal reinforcement or circumferentially through the trench, or both. With the parts so disposed concrete (or other hardenable materials) can be poured into the trench to a level below the upper edge of the board which sandwiches the balloon against the inner surface 224 of the trench. The concrete is permitted to harden and then the board is removed leaving a large slot through which the balloon extends. This in effect constructs a keyhole slot anchoring block in situ.

However, in order to prevent the concrete or other hardenable material which will form the shell from filling the keyhole slot and thereby preventing the subsequent removal of the balloon from the anchoring block a flexible toroidal tube 230 is wedged into the slot prior to the laying of the concrete layer 212 over the balloon 210 which flexible tube will extend upwards above the base of the structure being formed. After the structure is formed and the balloon 216 is deflated the flexible tube 230 can be pulled out of the slot, the toroidal inflatable base 206 of the balloon 204 can be deflated and then the base 206 can be pulled out through the unobstructed slot to remove the balloon.

In applications wherein concrete is to be used for the building material in the construction of dome shaped structures the following composition of the concrete has proven particularly satisfactory for use with the method of this invention.

The aggregate is preferably alluvial and, if there are three available grades of aggregate in the gradings 0–4, 4–8 and 8–16, the following mixture should be adhered to:

| | |
|---|---|
| Sand 0–4 _____kilogram/cubic meter__ | 950 |
| Gravel 4–8 _____do____ | 290 |
| Pebble gravel 8–16 _____do____ | 560 |
| Cement type 600 Portland or Pozzolana____do____ | 500 |
| Added water, approx. _____liter/cubic meter__ | 150 |
| Pozzolith 3R or other similar additive_____do____ | 4.8 |
| MBVR or other aerating agent _____do____ | 0.12 |

At the time of positioning the concrete on the balloon member, the mixture must have a slump of about 22–23 centimeter, measured with an Abrams cone, while the quantity of air enclosed in small bubbles may vary from a minimum of 6.2% to a maximum of 7%.

The resistance to breakage of small cubes left to dry for 28 days should not be less than 300 kilogram/cubic centimeter.

Where crushed aggregate has to be used, the proportions will be:

| | Percent |
|---|---|
| Sand | 57.5 |
| Gravel 4–8 | 18.5 |
| Pebble gravel 8–16 | 24.0 | with a slight increase in the quantity of cement.

Representative data obtained during the construction of three single walled dome-shaped structures in Italy, and clearly illustrating the significant economies of construction made possible through the use of the method of this invention, are as follows:

STRUCTURE DIMENSIONS

| | |
|---|---|
| Diameter _____meter__ | 12.5 |
| Height _____do___ | 6.25 |
| Ground surface area covered _____square meter__ | 123 |
| Exterior surface area of the structure _____do___ | 246 |
| Volume of the structure _____cubic meter__ | 500 |
| Wall thickness _____centimeter__ | 4–6 |

EFFECTIVE MATERIAL AND TIME CONSUMPTION

| | For the entire structure | Per sq. meter of covered ground surface area | Per sq. meter of exterior structure surface |
|---|---|---|---|
| Reinforcing steel (kilogram) | 375 | 3.05 | 1.58 |
| Wire network (kilogram) | 230 | 1.87 | 0.94 |
| Steel chains (kilogram) | 37 | 0.30 | 0.15 |
| Cement (kilogram) | 6800 | 55.20 | 27.60 |
| Sand and gravel (kilogram) | 32,000 | 263.50 | 131.75 |
| Working hours | 200 | 1.65 | 0.82 |

Upon completion of the basic construction, each of the structures was thermally insulated through the coating thereof with fiberglass and bitumen insulating materials, and the exterior surfaces thereof painted with a reflecting color. The cost of this coating and painting amounted to approximately $370 per structure, and the price of each of the finished structures to approximately $1200.

The costs of construction per structure may be partially broken down as follows:

| | Percent |
|---|---|
| Reinforcing steel | 3.52 |
| Wire network | 3.32 |
| Steel chains | 1.82 |
| Concrete | 21.99 |
| Coating | 28.90 |
| Depreciation | 7.22 |
| Energy, etc. | 5.78 |

With regard to this cost breakdown, it is noted that depreciation of the requisite balloon members and construction machinery was conservatively based on the usage thereof for the construction of only 250 structures, whereas the said balloon members and construction machinery are generally guaranteed by the respective manufacturers thereof for the construction of 500 structures. In addition, the relatively high price of ready-mixed concrete was used, which price would, of course, more than cover the price of concrete mixed at the construction site. Capital, development and management expenses were not considered as these factors are extremely variable from country to country and even from location to location within the same country.

Of the greatest significant is believed the fact that the overall costs per 100 square meter of covered ground surface area amounted to a remarkably low $975, it being noted that there is no construction system known and employed in the world today which can satisfactorily produce permanent structures at this cost rate.

In fact, this cost rate per 100 square meter of covered ground area may be reduced even further, and quite considerably, if the height H of the dome-shaped structure is reduced in relation to the radius R thereof. This further reduction based on instances wherein the radius R is maintained constant is as follows:

| Relation of H to R— | Structure cost per 100 square meter |
|---|---|
| H=R | $975 |
| H=0.9R | 891 |
| H=0.8R | 810 |
| H=0.7R | 727 |
| H=0.6R | 661 |
| H=0.5R | 610 |

Thus may be seen that, in essence, the costs of construction decrease considerably as the roof of the dome-shaped structure is flattened.

It would not appear unreasonable to assume that even further reductions in these construction costs will be made possible as more experience is obtained through the continued usage of the method of this invention.

Although the possibilities for application of the method of this invention to the construction of structures probably approach the unlimited and cannot, in any event, all be foreseen at this time, it is noted that the said method would appear to find particularly satisfactory utilization in the construction of structures for agricultural purposes in the nature of dairy farms and food storage buildings, simple and comfortable dwelling houses as discussed above, schools, offices, buildings for military use, tunnel, subway and drainage systems.

With regard to the construction of homes, the application of the method of this invention should be understood to offer the prospective purchaser thereof two fundamental and important choices as compared to homes erected by conventional construction methods. On the one hand, the said method enables the purchase at a very low initial price, of a home constructed by the cost saving method of this invention and the furnishing and appointment thereof at a relatively expensive level to result in a home which is furnished and appointed in a far superior manner, as compared to the same home constructed in conventional manner, for the same total cash outlay. On the other hand, if homes with comparable furnishings and appointments are considered, the purchase of one constructed in accordance with the method of this invention will, of course, result in very substantial cash savings.

While I have herein shown and described the preferred form of the present invention and have suggested modifications thereof, other changes and modifications may be made therein without departing from the spirit and scope of this invention.

What is claimed is:

1. In a method for erecting a reinforced structure of a hardenable building material through the use of a substantially two-dimensional expandable member which is inflatable to a three-dimensional shape so that a portion at least thereof is substantially in the desired shape of a portion at least of said structure, the steps of:

(a) positioning over said portion of said member expandable reinforcing means which are readily deformable from a substantially two-dimensional configuration to a three-dimensional configuration, (b) distributing over said portion of said member a hardenable building material to form a layer covering at least a portion of said reinforcing means, said hardenable building material having a fluidity high enough to permit redistribution thereof during step (c) and low enough to prevent substantial flow thereof off said member, and (c) then inflating said member while said building material is in unhardened condition to cause said portion of said member to assume said desired shape and to position said hardenable building material in said shape, whereby said structure will be formed by the hardening of said hardenable building material.

2. The method of claim 1, wherein the hardenable building material is concrete.

3. The method of claim 2, wherein the expandable reinforcing means is made of steel.

4. The method of claim 1, further comprising the steps of anchoring said member to a supporting surface and securing said reinforcing means to said supporting surface prior to the inflation of said expandable member.

5. The method of claim 1, further comprising the step of vibrating said hardenable building material layer and said reinforcing means after the inflation of said expandable member but before the hardening of said hardenable building material layer to insure proper embedment of said reinforcing means in said hardenable building material layer and to provide a smooth building material layer surface upon the hardening of the latter.

6. The method of claim 1, wherein the step of distributing the hardenable building material over said reinforcing means and member portion includes the substantial covering of said reinforcing means by said hardenable building material.

7. The method of claim 4, wherein the step of inflating said expandable member includes the inflation thereof to an extent sufficient to place and maintain said reinforcing means in tension during the hardening of said hardenable building material layer, and said method further comprises the step of subsequently deflating said expandable member after the hardening of said hardenable building material layer to cause said reinforcing means to place said hardened building material layer in compression and accordingly prestress the latter.

8. The method of claim 1, further comprising the step of anchoring the periphery of said member in substantially air-tight manner to a supporting surface to form a substantially air-tight volume between said surface and said member, and the step of inflating said member includes the step of introducing a fluid under pressure to said volume.

9. The method of claim 8, wherein the hardenable building material is concrete.

10. The method of claim 8, wherein said expandable member comprises independently inflatable means formed at the periphery thereof, and the step of anchoring said member to said supporting surface comprises the placement of said inflatable means in a keyhole type slot provided therefor in said supporting surface and the subsequent inflation of said inflatable means to substantially fill said slot.

11. The method of claim 10, wherein the hardenable building material is concrete.

12. The method of claim 10, further comprising the step of securing said reinforcing means to said supporting surface prior to the inflation of said expandable member, and wherein the step of inflating said expandable member includes the inflation thereof to an extent sufficient to place and maintain said reinforcing means in tension during the hardening of said hardenable building material, whereby the subsequent deflation of said expandable member after the hardening of said hardenable building material will cause said reinforcing means to place said hardened building material in compression and accordingly prestress the latter.

13. The method of claim 1, wherein said expandable member includes guide means formed thereon for bordering said portion and maintaining a layer of said hardenable building material thereon, and the step of distributing said hardenable building material includes the distribution thereof only within the area bordered by said guide means.

14. In a method of construction a structure which compirses an inner wall enclosed within and spaced from an outer wall, the steps of constructing said outer wall in accordance with the method of claim 1, and constructing said inner wall in accordance with the method of claim 1.

15. The method of claim 14, wherein said inner wall is constructed first.

16. The method of claim 14, wherein said outer wall is constructed first.

17. The method of claim 16, further comprising the step of forming an access opening in said first all to provide access to the interior thereof to enable the construction of said second wall therewithin.

18. The method of claim 1, wherein said expandable member is highly stretchable.

19. The method of claim 1, wherein said expandable reinforcing means is highly stretchable.

20. The method of claim 18, wherein the hardenable building material is concrete.

21. The method of claim 20, wherein the expandable reinforcing means is made of steel.

22. The method of claim 19, wherein the hardenable building material is concrete.

23. The method of claim 19, wherein said highly stretchable reinforcing means comprises a coil spring.

24. The method of claim 19, wherein said highly stretchable reinforcing means comprises a plurality of superposed layers of coil spring, each of said layers including portions extending in directions that are angularly displaced and intersecting the direction in which portions of an adjacent layer extend.

25. The method of claim 19, wherein said highly stretchable reinforcing means comprises a plurality of superposed layers of coil spring, one of said layers including a plurality of parallel portions, another of said layers including another plurality of parallel portions extending perpendicular to said parallel portions of said first mentioned layer.

26. The method of claim 1, wherein said highly stretchable reinforcing means comprises a plurality of superposed layers of coil spring, one of said layers including a spirally extending portion, another of said layers including a plurality of angularly offset radially extending portions.

27. The method of claim 1, wherein said expandable member is highly stretchable.

28. The method of claim 1, wherein said reinforcing means includes means for limiting the stretchability of a portion of said reinforcing means.

29. The method of claim 23, wherein said reinforcing means includes a relatively nonstretchable wire or predetermined length disposed within said coil spring for limiting the stretch thereof.

30. The method of claim 18, further comprising the steps of deflating said member after the hardening of said hardenable building material, depositing a second layer of hardenable building material on said member, then inflating said member to a lesser extent than said first mentioned inflation to cause said member portion to assume a smaller shape than said desired shape to position said second layer of hardenable material within said hardened first layer.

31. The method of claim 1, further comprising the steps of disposing a second expandable member of smaller diametral extent than said first expandable member under the central portion of said first expandable member, and inflating said second member to elevate said central portion of said first mentioned expandable member in advance of any substantial inflation of said first mentioned member.

32. In a method of erecting a reinforced structure which includes at least one double walled portion thereof through the use of a first expandable member which is inflatable to cause at least a portion thereof to expand and to assume a shape which substantially corresponds to the desired shape of said structure, and a second expandable member which is inflatable to expand and assume a shape which substantially corresponds to the desired shape of said double walled portion, the steps of, anchoring said first expandable member to a supporting surface, placing reinforcing means which are expandable to a shape which substantially corresponds with the desired shape of said structure over said portion of said first inflatable member, then distributing a hardenable building material on said first inflatable member portion to form a layer of said hardenable building material having a fluidity high enough to permit redistribution thereof during inflation and low enough to prevent substantial flow thereof thereon, placing said second inflatable member over said hardenable building material layer, placing a reinforcing means over said second inflatable member and attaching the former to said expandable reinforcing means, then distributing said hardenable building material over said second inflatable member to form a layer of said hardenable building material over said second inflatable member, then inflating said first expandable member to cause said first expandable member portion to assume said shape thereof and position said hardenable building material layer and said first reinforcing means in said shapes thereof, inflating said second inflatable member to form said double walled portion by the formation of a space between said layer of hardenable building material distributed over said first expandable member portion, and said layer of hardenable building material distributed over said second inflatable member whereby, said reinforced structure including at least one double-walled portion thereof will be formed by the hardening of said building material layers.

References Cited

UNITED STATES PATENTS

| | | | |
|---|---|---|---|
| 3,329,750 | 7/1967 | Growald | 264—45 |
| 3,389,202 | 6/1968 | Waling | 264—134 |
| 3,390,211 | 6/1968 | Ziegler | 264—32 |
| 2,771,655 | 11/1956 | Nervi | 264—228 |
| 2,892,239 | 6/1959 | Neff | 25—154 |
| 3,020,618 | 2/1962 | Eward | 264—35 |
| 3,231,644 | 1/1966 | Chang | 264—34 |
| 3,265,795 | 8/1966 | Medney | 264—157 |
| 3,316,337 | 4/1967 | North | 264—231 |
| 3,355,529 | 11/1967 | Easterday | 264—32 |
| 2,948,047 | 8/1960 | Peeler | 25—154 |
| 3,058,190 | 8/1962 | Wogulis. | |
| 3,223,759 | 12/1965 | Williamson | 264—34 |

ROBERT F. WHITE, Primary Examiner

R. R. KUCIA, Assistant Examiner

U.S. Cl. X.R.

264—35, 69, 228, 253, 314

UNITED STATES PATENT OFFICE
CERTIFICATE OF CORRECTION

Patent No. 3,462,521                      August 19, 1969

Dante Bini

It is certified that error appears in the above identified patent and that said Letters Patent are hereby corrected as shown below:

Column 16, line 74, "This illustrates in" should read -- This is illustrated in --. Column 20, line 56, "balloon 2044 whether" should read -- balloon 204 (whether --. Column 24, line 28, "construction" should read -- constructing --; line 38, "all" should read -- wall --; line 66 (indicated as line 67), "claim 1," should read -- claim 19, --; line 72 (indicated as line 74), "claim 1," should read -- claim 19, --. Column 25, line 1, "claim 1," should read -- claim 19, --; line 42, "flow thereof thereon," should read -- flow thereoff, --.

This certificate supersedes the Certificate of Correction issued May 19, 1970.

Signed and sealed this 22nd day of December 1970.

(SEAL)
Attest:

EDWARD M. FLETCHER, JR.                      WILLIAM E. SCHUYLER, JR.
Attesting Officer                            Commissioner of Patents